US011215765B2

(12) United States Patent
Hsu et al.

(10) Patent No.: US 11,215,765 B2
(45) Date of Patent: Jan. 4, 2022

(54) OPTICAL FIBER CONNECTOR

(71) Applicant: Gloriole Electroptic Technology Corp., Kaohsiung (TW)

(72) Inventors: Shu-Hui Hsu, Kaohsiung (TW); Li-Yun Chen, Kaohsiung (TW); Jim Lin, Kaohsiung (TW)

(73) Assignee: GLORIOLE ELECTROPTIC TECHNOLOGY CORP., Kaohsiung (TW)

(*) Notice: Subject to any disclaimer, the term of this patent is extended or adjusted under 35 U.S.C. 154(b) by 0 days.

(21) Appl. No.: 16/919,915

(22) Filed: Jul. 2, 2020

(65) Prior Publication Data

US 2021/0003789 A1      Jan. 7, 2021

(30) Foreign Application Priority Data

Jul. 3, 2019   (TW) .................................. 108208632

(51) Int. Cl.
*G02B 6/38*            (2006.01)

(52) U.S. Cl.
CPC ......... *G02B 6/3831* (2013.01); *G02B 6/3893* (2013.01)

(58) Field of Classification Search
CPC ........................... G02B 6/3831; G02B 6/3893
USPC .......................................................... 385/78
See application file for complete search history.

(56) References Cited

U.S. PATENT DOCUMENTS

| | | | | |
|---|---|---|---|---|
| 9,804,340 | B1* | 10/2017 | Lin ...................... | G02B 6/3821 |
| 2012/0082416 | A1* | 4/2012 | Katoh .................. | G02B 6/3831 |
| | | | | 385/72 |
| 2016/0259135 | A1* | 9/2016 | Gniadek .............. | G02B 6/3885 |
| 2018/0011254 | A1* | 1/2018 | Takano ................ | G02B 6/387 |
| 2019/0154924 | A1* | 5/2019 | Chang ................. | G02B 6/3825 |
| 2019/0235171 | A1* | 8/2019 | Brusberg ............. | G02B 6/2852 |
| 2019/0384017 | A1* | 12/2019 | Lu ........................ | G02B 6/3893 |
| 2020/0166716 | A1* | 5/2020 | Chang ................. | G02B 6/3853 |
| 2020/0183097 | A1* | 6/2020 | Chang ................. | G02B 6/3885 |
| 2020/0301077 | A1* | 9/2020 | Leigh .................. | G02B 6/3831 |

* cited by examiner

*Primary Examiner* — Kaveh C Kianni
(74) *Attorney, Agent, or Firm* — Muncy, Geissler, Olds & Lowe, P.C.

(57) ABSTRACT

An optical fiber connector includes an outer sleeve and a main casing body. The outer sleeve includes a surrounding wall and a key portion extending forwardly from the surrounding wall. The main casing body includes a wall portion defining a mounting space for receiving a portion of a mechanical transfer (MT) ferrule mounted with a plurality of optical fibers therein. The outer sleeve is detachably sleeved on the wall portion. The wall portion has two opposite outer connecting surfaces formed respectively with two keyways. The key portion engage one of the keyways. The outer sleeve is detachable from the main casing body so as to allow the key portion to engage the other one of the keyways.

12 Claims, 6 Drawing Sheets

OPTICAL FIBER CONNECTOR

CROSS-REFERENCE TO RELATED APPLICATION

This application claims priority to Taiwanese Patent Application No. 108208632, filed on Jul. 3, 2019.

FIELD

The disclosure relates to an optical fiber connector, more particularly to a multiple-fiber push on (MPO) connector.

BACKGROUND

Referring to FIG. 1, a conventional multiple-fiber push on (MPO) connector 1 to be connected to a ferrule member 11 mounted with a plurality of optical fibers is shown. The conventional MPO connector 1 includes a main casing body 12, an end cap 13 sleeved on and covering the main casing body 12, an outer sleeve 14 sleeved on the main casing body 12 and movable along a front-rear direction, and a key part 15 integrally formed on the main casing body 12. The polarity of the optical fibers connected to the conventional MPO connector 1 can be adjusted by changing orientation of the key part 15 to a key-up position and a key-down position. FIG. 1 shows that the key part 15 is at the key-up position.

However, since the key part 15 is formed integrally on the main casing body 12, it is troublesome to change the polarity of the optical fibers connected to the conventional MPO connector 1. To change polarity, the main casing body 12, the ferrule member 11 and the end cap 13 are first disassembled from one another, then the key part 15 together with the main casing body 12 is rotated relative to the ferrule member 11 by 180 degrees to the key-down position. Finally, the casing body 12, the ferrule member 11, and the end cap 13 are reassembled again. Such process is complicated and time-consuming. Additionally, the possibility of losing the elements of the conventional MPO connector 1 such as the ferrule member 11 is increased.

SUMMARY

Therefore, an object of the disclosure is to provide an optical fiber connector capable of changing polarity of optical fibers connected thereto in a relatively simple manner.

According to one aspect of the disclosure, an optical fiber connector adapted to use with a mechanical transfer (MT) ferrule mounted with a plurality of optical fibers is provided. The optical fiber connector includes an outer sleeve and a main casing body. The outer sleeve includes a surrounding wall and a key portion extending forwardly from the surrounding wall along a first direction. The main casing body includes a wall portion defining a mounting space adapted to receive a portion of the MT ferrule and the optical fibers therein. The outer sleeve is detachably sleeved on the wall portion. The wall portion has two outer connecting surfaces opposite to each other along a second direction transverse to the first direction, and formed respectively with two keyways that extend along the first direction. The key portion of the outer sleeve engages one of the keyways. The outer sleeve is detachable from the main casing body so as to allow the key portion to engage the other one of the keyways.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
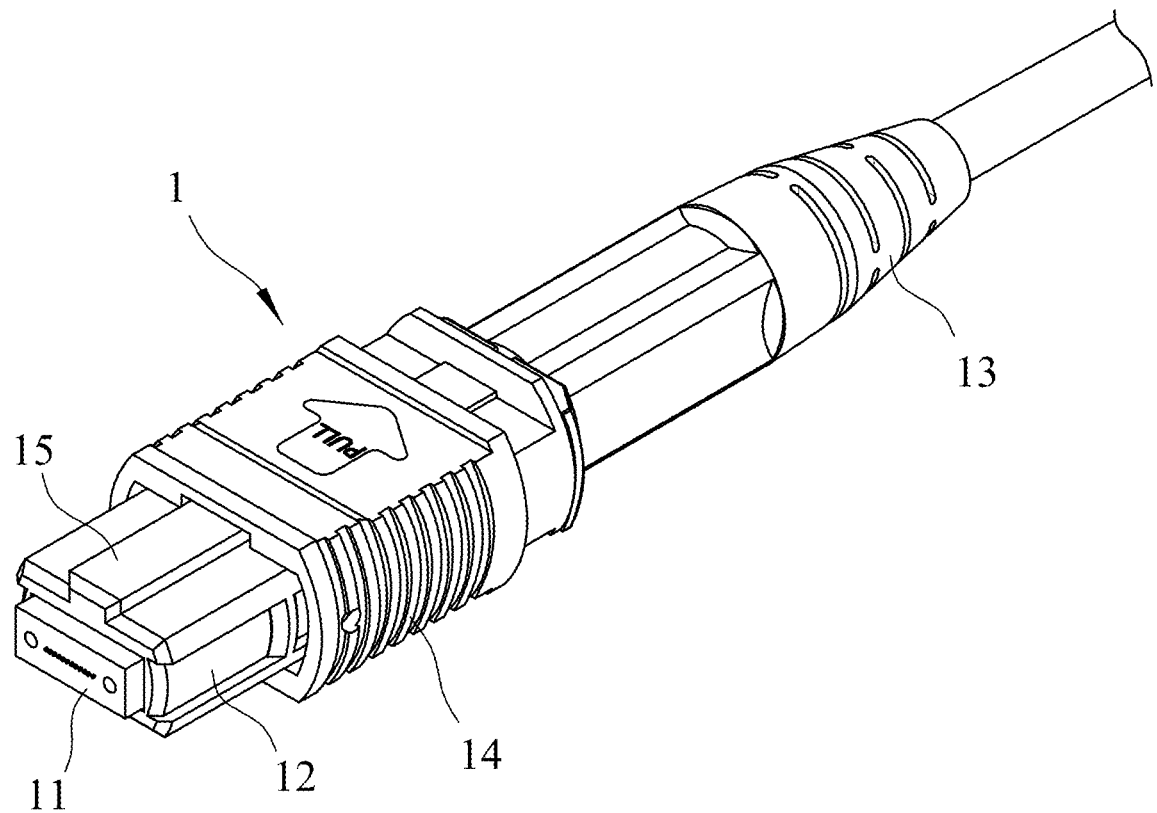
FIG. 1 is a perspective view of a conventional optical fiber connector.
Figure 2:
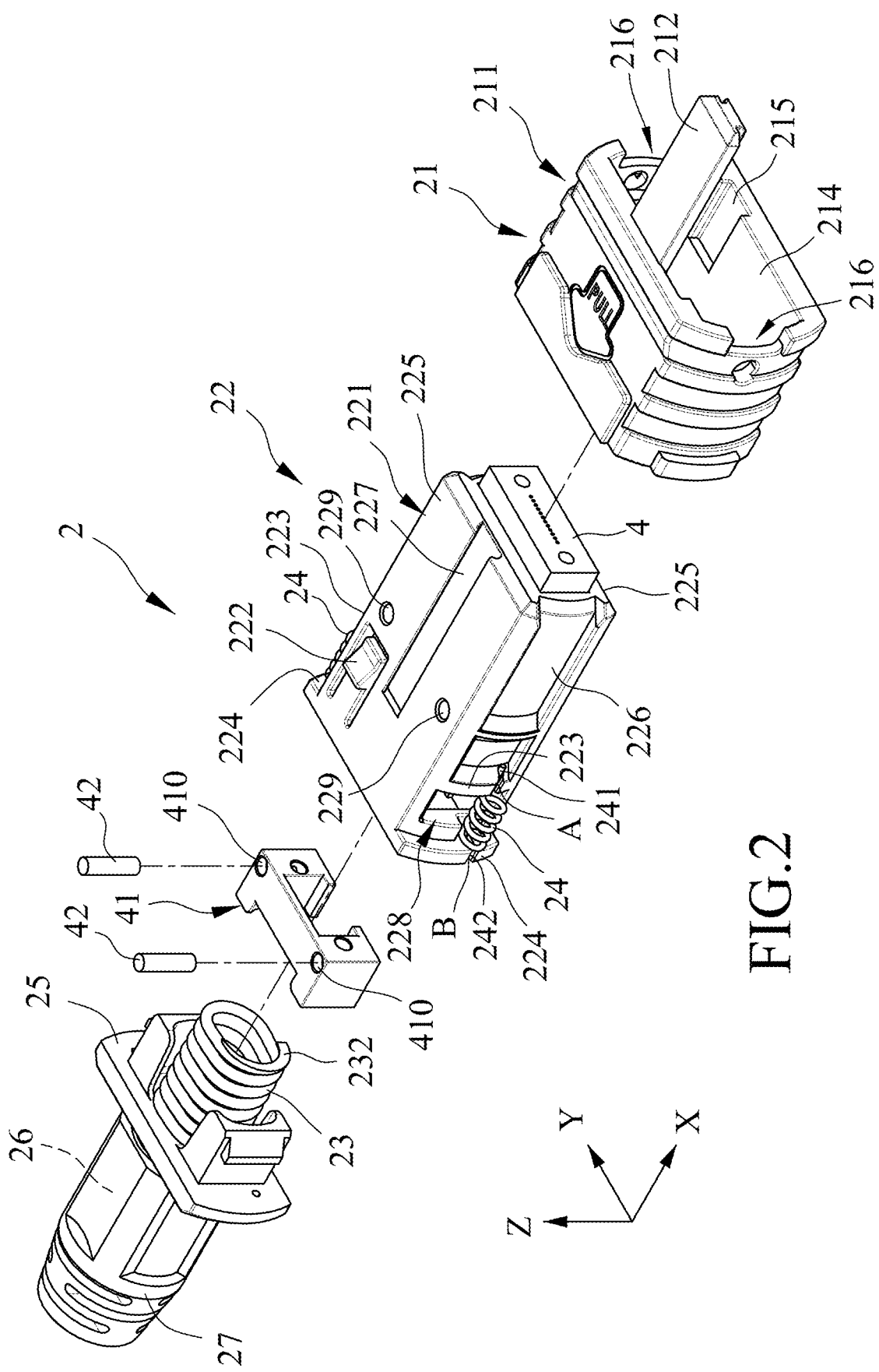
FIG. 2 is an exploded perspective view of an optical fiber connector according to an embodiment of the present disclosure and a mechanical transfer (MT) ferrule to be used with the embodiment.
Figure 3:
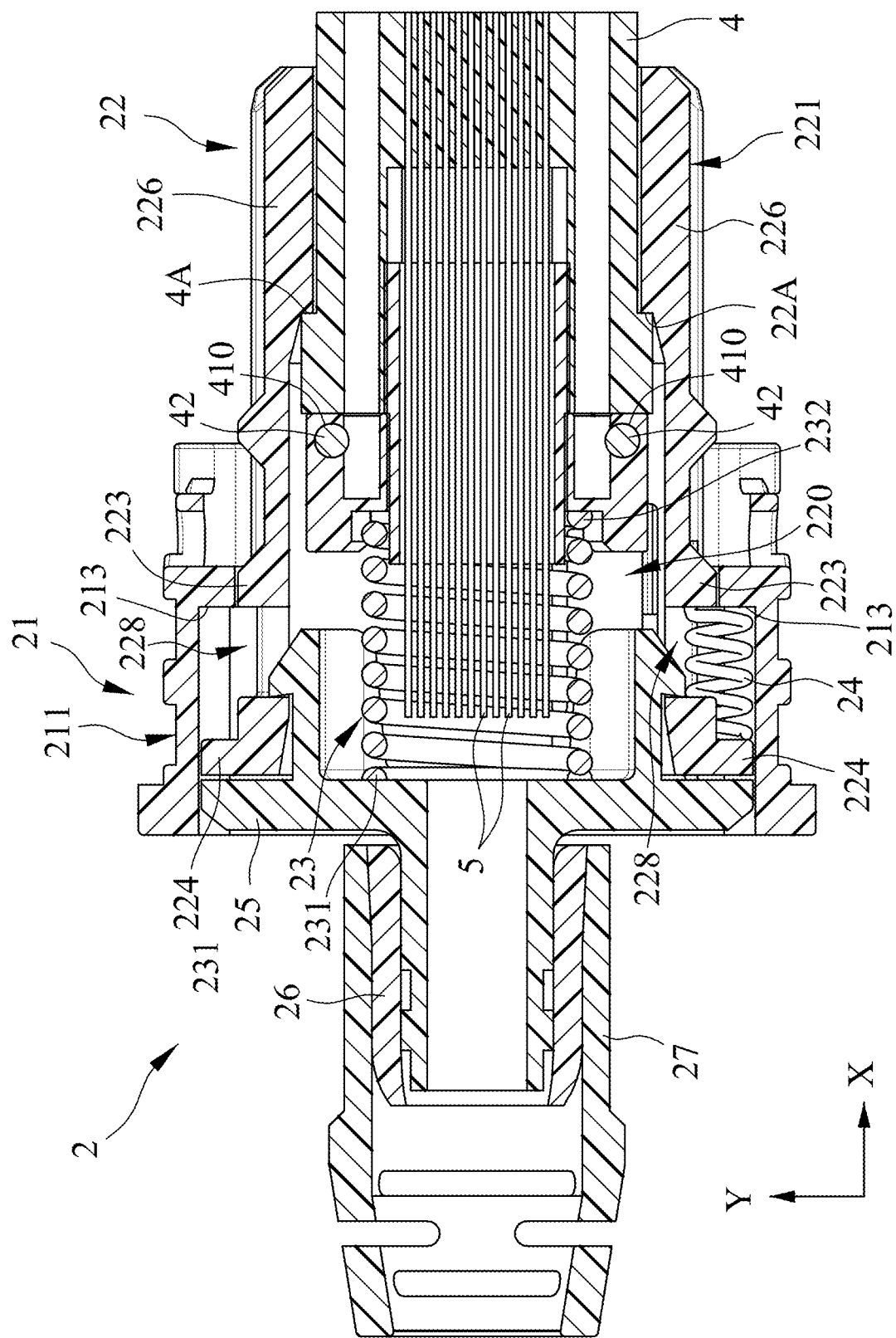
FIG. 3 is a sectional view of the optical fiber connector of the embodiment and the MT ferrule mounted with a plurality of optical fibers.
Figure 4:
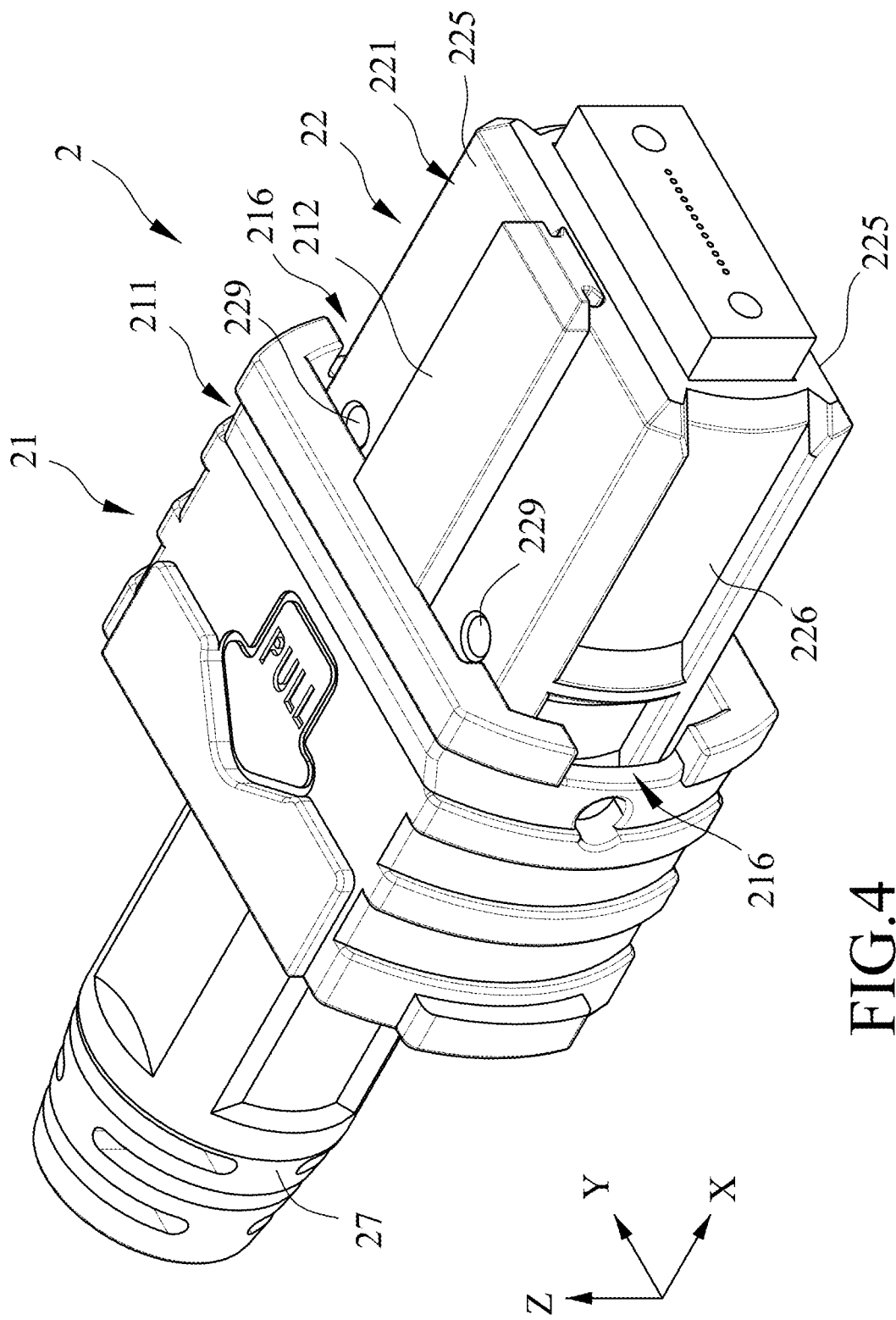
FIG. 4 is an assembled perspective view of the embodiment.

Referring to FIGS. 2 to 4, an optical fiber connector 2 according to an embodiment of the present disclosure is shown. The optical fiber connector 2 is adapted to use with a mechanical transfer (MT) ferrule 4 mounted with a plurality of optical fibers 5, and includes an outer sleeve 21, a main casing body 22, a compression spring 23, two biasing members 24, a mounting seat 25, a tubular member 26, and an end cap 27.

The outer sleeve 21 is detachably sleeved on the main casing body 22 and is movable relative to the main casing body 22 along a first direction (X). The outer sleeve 21 includes a surrounding wall 211 and a key portion 212. The surrounding wall 211 surrounds the main casing body 22 and has an inner surface 214 facing the main casing body 22. The inner surface 214 of the outer sleeve 21 is formed with two limiting slots 215 (only one of the limiting slots 215 is visible in FIG. 2) opposite to each other along a second direction (Z) transverse to the first direction (X). The key portion 212 extends forwardly from the surrounding wall 211 along the first direction (X). The compression spring 23 is mounted in the main casing body 22 and extends along the first direction (X). The biasing members 24 are mounted at the main casing body 22 and are opposite to each other along a third direction (Y) transverse to the first direction (X) and the second direction (Z). The biasing members 24 are mounted to the main casing body 22, and are opposite to each other along the third direction (Y). The mounting seat 25 is disposed behind the main casing body 22 along the first direction (X). The tubular member 26 extends along the first direction (X) and is sleeved on a rear portion of the mounting seat 25. The end cap 27 is sleeved on and covers the tubular member 26.

The main casing body 22 includes a wall portion 221 on which the outer sleeve 21 is detachably sleeved on. The wall portion 221 defines a mounting space 220 adapted to receive a portion of the MT ferrule 4 and the optical fibers 5 therein. The wall portion 221 has two side surfaces 226 opposite to each other along the third direction (Y), and two outer connecting surfaces 225 opposite to each other along a second direction (Z) transverse to the first direction (X) and the third direction (Y). The outer connecting surfaces 225 are formed respectively with two keyways 227 (only one is visible in FIG. 2) extending along the first direction (X). In this embodiment, each of the keyways 227 has an open front end, and a closed rear end. The first direction (X) is a front-rear direction, the second direction (Z) is an up-down direction, and the third direction (Y) is a left-right direction.

The key portion 212 of the outer sleeve 21 engages one of the keyways 227. The outer sleeve 21 is detachable from the main casing body 22 so as to allow the key portion 212 to engage the other one of the keyways 227 as required. The polarity of the optical fibers 5 connected to the optical fiber connector 2 can be adjusted by changing orientation of the key portion 212 between a key-up position and a key-down position. As shown in FIG. 4, the key portion 212 engages the upper one of the keyways 227 and is at the key-up position. Note that the key portion 212 is a dovetail tongue and the keyways 227 are dovetail grooves in this embodiment.

The main casing body 22 further includes two resilient hooks 222 protruding respectively from the wall portion 221, and detachably and respectively snapped fitted into the limiting slots 215 such that the outer sleeve 21 is positioned relative to the wall portion 221 of the main casing body 22.

Each of the side surfaces 226 of the main casing body 22 is connected to the outer connecting surfaces 225 and is formed with a receiving space 228 for mounting of a respective one of the biasing members 24. As shown in FIG. 2, the main casing body 22 further includes two front flanges 223 and two rear flanges 224. The front flanges 223 protrude respectively from the side surfaces 226 along the third direction (Y) away from each other and respectively define front ends of the receiving spaces 228 in the side surfaces 226. The rear flanges 224 are formed respectively on the side surfaces 226 and respectively define rear ends of the receiving spaces 228. Each of the front flanges 223 is formed with a first groove (A) and each of the rear flanges 224 is formed with a second groove (B). Each of the biasing members 24 has opposite ends 241, 242 extending respectively into the first groove (A) of a respective one of the front flanges 223 and the second groove (B) of a corresponding one of the rear flanges 224.

As shown in FIG. 3, the outer sleeve 21 further includes two shoulder portions 213 protruding from the inner surface 214, opposite to each other along the third direction (Y), and disposed in front of and abutting against the biasing members 24, respectively. The mounting seat 25 is disposed behind and abuts against the rear flanges 224 of the wall portion 221 of the main casing body 22. The ends 242 of the biasing members 24 extending into the second grooves (B) of the rear flanges 224 are connected to the mounting seat 25.

When the outer sleeve 21 is operated to move rearwardly relative to the main casing body 22, the shoulder portions 213 respectively compress the biasing members 24 until the key portion 212 engaging the upper one of the keyways 227 abuts against a wall defining the closed rear end of the upper one of the keyways 227. In this way, when the resilient hooks 222 are detached from the limiting slots 215, e.g., by a flat screwdriver, the biasing members 24 bias the outer sleeve 21 to move forwardly relative to the main casing body 22 so as to facilitate detachment operation of the outer sleeve 21 from the main casing body 22.

It should be noted that since the biasing members 24 are spaced apart from each other along the second direction (Z), only one of the biasing members 24 is visible in FIG. 3.

As shown in FIG. 3, the MT ferrule 4 connected to the optical fiber connector 2 has a shoulder surface 4A and the main casing body 22 has a shoulder surface 22A adapted to face the shoulder surface 4A of the MT ferrule 4. The compression spring 23 is mounted in the mounting space 220 and has a first end 231 connected to the mounting seat 25 and a second end 232 opposite to the first end 231 along the first direction (X) and adapted to be connected to the MT ferrule 4 for biasing the shoulder surface 22A of the main casing body 22 to contact the shoulder surface 4A of the MT ferrule 4. In this way, the compression spring 23 biases the MT ferrule 4 away from the mounting seat 25 so as to prevent damage of the optical fibers 5.

Figure 5:
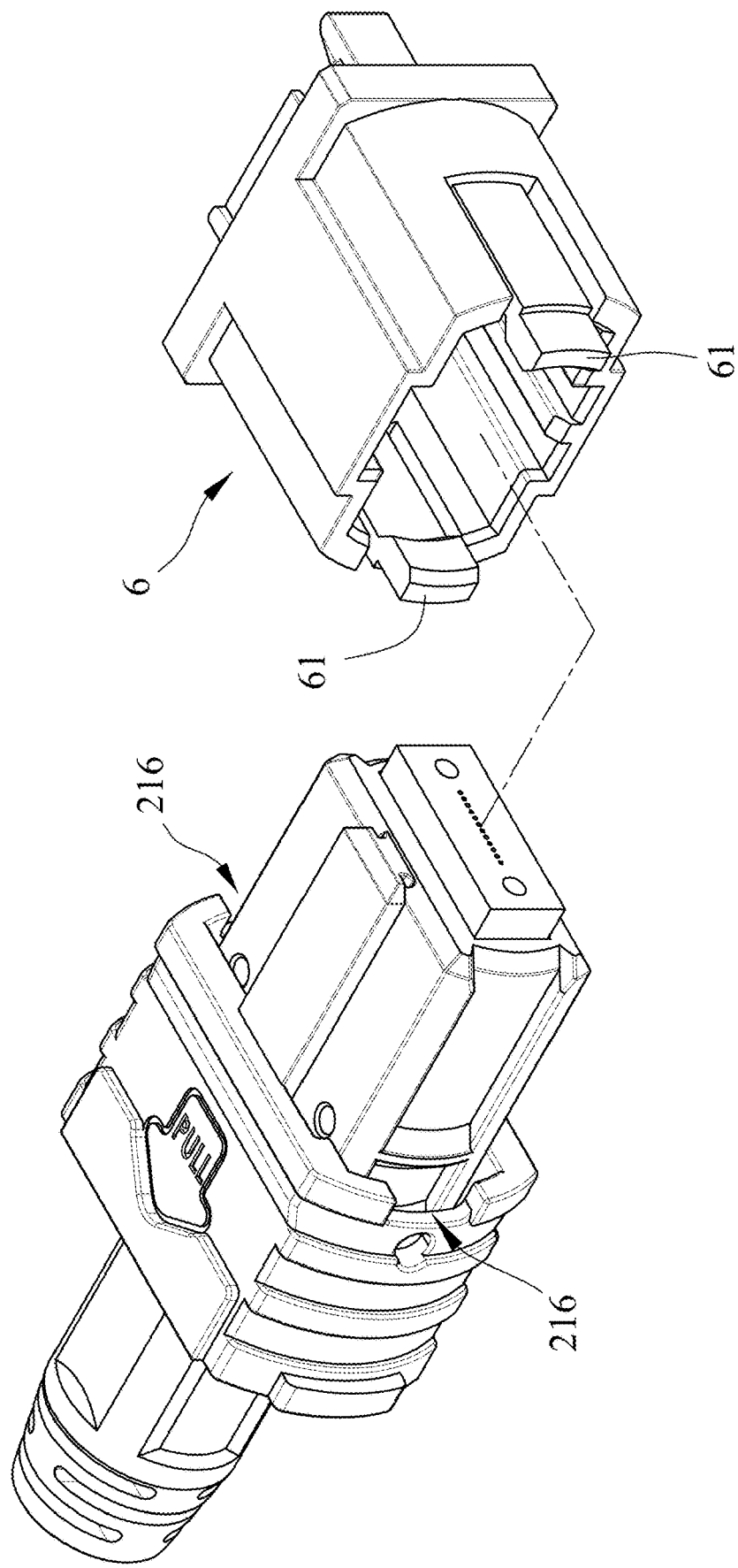
FIG. 5 is a perspective view of the embodiment and an additional optical fiber connector to be connected to the embodiment.

Further referring to FIG. 5, the surrounding wall 211 of the outer sleeve 21 is formed with two notches 216. The notches 216 open forwardly, are opposite to each other along the third direction (Y), and are adapted to permit an additional optical fiber connector 6 to be detachably connected to the main casing body 22. Specifically, the additional optical fiber connector 6 has two protrusions 61 detachably and respectively engaging the notches 216. By virtue of the design of the notches 216, the optical fiber connector 2 can be detached from the additional optical fiber connector 2 by slightly pulling the outer sleeve 21 rearwardly to disengage the protrusions 61 from the notches 216, respectively. In this way, a travel distance of the outer sleeve 21 moving relative to the main casing body 22 for detaching the optical fiber connector 2 from the additional optical fiber connector 2 can be reduced.

Referring back to FIG. 2, the MT ferrule 4 connected to the optical fiber connector 2 includes a positioning element 41 formed with two through holes 410, and two pins 42. In one embodiment, each of the outer connecting surfaces 225 of the main casing body 22 is formed with two openings 229 opposite to each other along the third direction (Y). The main casing body 22 is adapted to permit the positioning element 41 to be mounted therein. The openings 229 of the main casing body 22 are adapted to correspond respectively in position to and are registered with the through holes 410 along the second direction (Z) to allow the pins 42 to extend through the openings 229 and the through holes 410 along the second direction (Z), so that the main casing body 22 is positioned relative to the MT ferrule 4.

Figure 6:
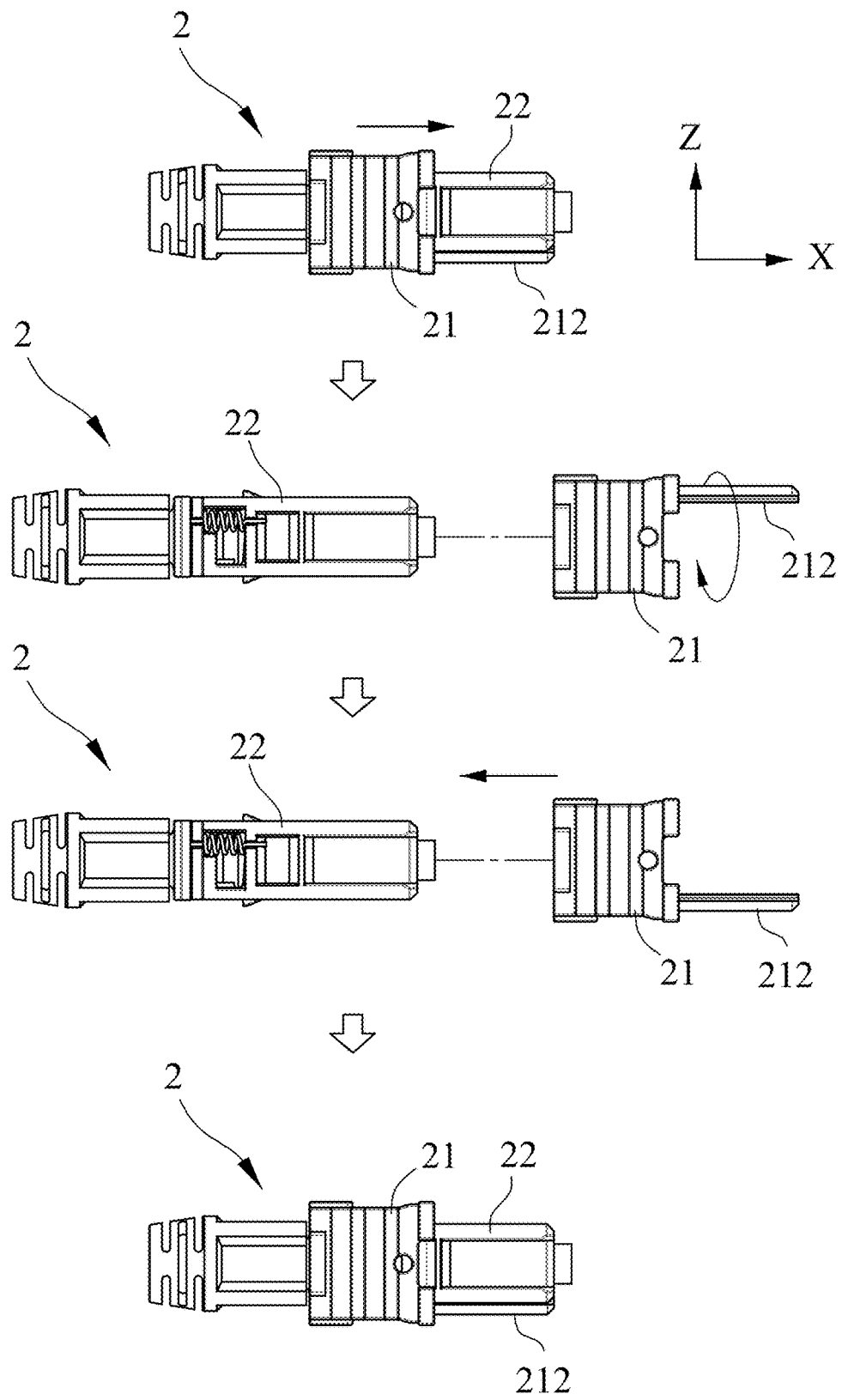
FIG. 6 illustrates operating procedure of changing polarity of the optical fibers connected to the embodiment.

The operation procedure of changing polarity of the optical fibers 5 connected to the optical fiber connector 2 is described in the following. As shown in FIGS. 3 and 4, the outer sleeve 21 is positioned relative to the main casing body 22 by virtue of the resilient hooks 222 engaging the limiting slots 215 and the key portion 212 engaging the upper one of the keyways 227. To change polarity of the optical fibers 5, further referring to FIG. 6, the flat screwdriver (not shown) is inserted individually into the limiting slots 215 to disengage the resilient hooks 22 respectively from the limiting slots 215. Then, the outer sleeve 21 can be pulled forwardly relative to the main casing body 22 to disengage the key portion 212 from the upper one of the keyways 227 and to detach the outer sleeve 21 from the main casing body 22. Subsequently, the outer sleeve 21 is rotated relative to the main casing body 22 by 180 degrees to align the key portion 212 with the lower one of the keyways 227 along the first direction (X), and then the outer sleeve 21 is brought to be sleeved back on the main casing body 22 such that the resilient hooks 222 respectively engage the limiting slots 215 again.

To sum up, by virtue of the structures of the key portion 212 that is formed on the outer sleeve 21, it is relatively simple to change polarity of the optical fibers 5 connected to the optical fiber connector 2. Disassemble of the MT ferrule 4 and the main casing body 22 is not required.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connector adapted for use with a mechanical transfer (MT) ferrule mounted with a plurality of optical fibers, comprising:
an outer sleeve including a surrounding wall and a key portion extending forwardly from said surrounding wall along a first direction; and
a main casing body including a wall portion which defines a mounting space adapted to receive a portion of the MT ferrule and the optical fibers therein, on which said outer sleeve is detachably sleeved, and which has two outer connecting surfaces opposite to each other along a second direction transverse to the first direction, and formed respectively with two keyways that extend along the first direction, said key portion of said outer sleeve engaging one of said keyways, said outer sleeve being detachable from said main casing body so as to allow said key portion to engage the other one of said keyways,
wherein said surrounding wall of said outer sleeve has an inner surface facing said main casing body and formed with two limiting slots that are opposite to each other along the second direction, said main casing body further including two resilient hooks protruding respectively from said wall portion and respectively and detachably snap fitted into said limiting slots such that said outer sleeve is positioned relative to said wall portion of said main casing body.

2. The optical fiber connector as claimed in claim 1, further comprising two biasing members mounted at said wall portion, and opposite to each other along a third direction transverse to the first direction and the second direction, said outer sleeve further including two shoulder portions protruding from said inner surface, opposite to each other along the third direction, and respectively abutting against said biasing members such that, when said resilient hooks are detached from said limiting slots, said biasing members bias said outer sleeve to move forwardly relative to said main casing body, so as to facilitate detachment operation of said outer sleeve from said main casing body.

3. The optical fiber connector as claimed in claim 2, wherein said wall portion further has two side surfaces opposite to each other along the third direction, each of said side surfaces being connected to said outer connecting surfaces and formed with a receiving space for mounting of a respective one of said biasing members.

4. The optical fiber connector as claimed in claim 3, wherein said main casing body further includes two front flanges protruding respectively from said side surfaces along the third direction away from each other and respectively defining front ends of said receiving spaces in said side surfaces, and two rear flanges formed respectively on said side surfaces and respectively defining rear ends of said receiving spaces, each of said front flanges being formed with a first groove, each of said rear flanges being formed with a second groove, each of said biasing members having opposite ends extending respectively into said first groove of a respective one of said front flanges and said second groove of a corresponding one of said rear flanges.

5. The optical fiber connector as claimed in claim 4, further comprising a mounting seat disposed behind and abutting against said rear flanges of said wall portion of said main casing body along the first direction, said ends of said biasing members extending into said second grooves of said rear flanges being connected to said mounting seat.

6. The optical fiber connector as claimed in claim 5, the MT ferrule having a shoulder surface, wherein said main casing body has a shoulder surface adapted to face the shoulder surface of the MT ferrule, said optical fiber connector further comprising a compression spring mounted in said mounting space and having a first end connected to said mounting seat and a second end opposite to said first end along the first direction and adapted to be connected to the MT ferrule for biasing said shoulder surface of said main casing body to contact the shoulder surface of the MT ferrule.

7. The optical fiber connector as claimed in claim 5, further comprising a tubular member extending along the first direction and sleeved on a rear portion of said mounting seat, and an end cap sleeved on and covering said tubular member.

8. The optical fiber connector as claimed in claim 1, wherein said key portion of said outer sleeve is a dovetail tongue and said keyways are dovetail grooves.

9. The optical fiber connector as claimed in claim 1, wherein said surrounding wall is formed with two notches open forwardly, opposite to each other along a third direction transverse to the first direction and the second direction, and adapted to permit an additional optical fiber connector to be detachably connected to said main casing body.

10. An optical fiber connector adapted for use with a mechanical transfer (MT) ferrule mounted with a plurality of optical fibers, the MT ferrule including a positioning element formed with two through holes, and two pins, said optical fiber connector comprising:
an outer sleeve including a surrounding wall and a key portion extending forwardly from said surrounding wall along a first direction; and
a main casing body including a wall portion which defines a mounting space adapted to receive a portion of the MT ferrule and the optical fibers therein, on which said outer sleeve is detachably sleeved, and which has two outer connecting surfaces opposite to each other along a second direction transverse to the first direction, and formed respectively with two keyways that extend along the first direction, said key portion of said outer sleeve engaging one of said keyways, said outer sleeve being detachable from said main casing body so as to allow said key portion to engage the other one of said keyways, wherein each of said outer connecting surfaces of said main casing body is formed with two openings opposite to each other along a third direction transverse to the first direction and the second direction, said main casing body being adapted to permit the positioning element to be mounted therein, said openings of said main casing body being adapted to correspond respectively in position to and being registered with said through holes along the second direction to allow the pins to extend through said openings and the through holes along the second direction, so that said main casing body is positioned relative to the MT ferrule.

11. The optical fiber connector as claimed in claim 10, wherein said key portion of said outer sleeve is a dovetail tongue and said keyways are dovetail grooves.

12. The optical fiber connector as claimed in claim 10, wherein said surrounding wall is formed with two notches open forwardly, opposite to each other along the third direction, and adapted to permit an additional optical fiber connector to be detachably connected to said main casing body.

* * * * *